United States Patent [19]

Douglas et al.

[11] Patent Number: 5,652,908
[45] Date of Patent: Jul. 29, 1997

[54] METHOD AND APPARATUS FOR ESTABLISHING COMMUNICATIONS SESSIONS IN A REMOTE RESOURCE CONTROL ENVIRONMENT

[75] Inventors: Francis Archibald Brown Douglas, Bethesda, Md.; David Andrew Glowny, Naugatuck, Conn.; Colette Anne Mastrangelo, Danbury, Conn.; Paul Melvin Mayer, Middlebury, Conn.; Peter David Shier, Danbury, Conn.; Jenngang Shih, Bronx, N.Y.; Robin Smith, San Leandro, Calif.

[73] Assignee: International Business Machines Corporation, Armonk, N.Y.

[21] Appl. No.: 474,528

[22] Filed: Jun. 7, 1995

Related U.S. Application Data

[63] Continuation of Ser. No. 222,496, Apr. 4, 1994, abandoned, which is a continuation of Ser. No. 771,064, Oct. 2, 1991, abandoned.

[51] Int. Cl.$^6$ .................................................. G06F 11/00
[52] U.S. Cl. ............. 395/800; 395/200.01; 395/200.12; 395/182.01; 395/185.01; 364/268; 364/944.61
[58] Field of Search ................... 395/800, 200.01, 395/200.12, 182.01, 185.01; 364/268, 944.61

[56] References Cited

U.S. PATENT DOCUMENTS

| | | | |
|---|---|---|---|
| 4,430,700 | 2/1984 | Chadima, Jr. et al. | 364/200 |
| 4,630,196 | 12/1986 | Bednar, Jr. et al. | 395/200 |
| 4,780,821 | 10/1988 | Crossley | 364/200 |
| 4,802,164 | 1/1989 | Fukuoka et al. | 371/16.1 |
| 4,807,224 | 2/1989 | Naron et al. | 370/94 |
| 4,872,106 | 10/1989 | Slater | 395/575 |
| 4,893,307 | 1/1990 | McKay et al. | 370/94.1 |
| 4,984,240 | 1/1991 | Keren-Zui et al. | 371/8.2 |
| 5,005,122 | 4/1991 | Griffin et al. | 364/200 |
| 5,023,873 | 6/1991 | Stevenson et al. | 371/8.2 |
| 5,027,269 | 6/1991 | Grant et al. | 364/200 |
| 5,043,881 | 8/1991 | Hamazaki | 364/200 |
| 5,058,108 | 10/1991 | Mann et al. | 370/85.1 |
| 5,121,486 | 6/1992 | Kurihara et al. | 395/325 |
| 5,129,080 | 7/1992 | Smith | 395/575 |
| 5,142,622 | 8/1992 | Owens | 395/200 |
| 5,157,663 | 10/1992 | Major et al. | 371/9.1 |
| 5,341,477 | 8/1994 | Pitkin et al. | 395/200 |
| 5,343,477 | 8/1994 | Yamada | 371/8.2 |

*Primary Examiner*—Thomas G. Black
*Assistant Examiner*—Valerie Darbe
*Attorney, Agent, or Firm*—William A. Kinnaman, Jr.; Lily Neff

[57] ABSTRACT

A system for providing distributed control of a resource with centralized configuration management. A network of distributed workstations is provided for controlling a resource such as a large mainframe computer. Server workstations for applying control commands to the resource are attached to each resource, preferably through redundant connections. Remote client consoles are defined which may be connected to the server for control of that resource. Server and resource location and primary and fallback connection paths are maintained by a centralized control server. Upon client console request, the central control server causes the server workstation associated with a particular resource to establish a control session between the server and the client console. A record of each dynamic connection is maintained by the central control server. Upon failure of a client console, the server accesses central server fallback information and establishes a fallback connection with an operational client console. Failure of a server workstation causes the resource to establish a link with a backup server which is then able to recover all sessions with client consoles by accessing the dynamic configuration database of the central controller. Configuration data may be updated dynamically taking effect when the next request for establishment of a session is made. In an alternate embodiment, interprocess security is optionally implemented in control servers and hardware resource servers.

9 Claims, 5 Drawing Sheets

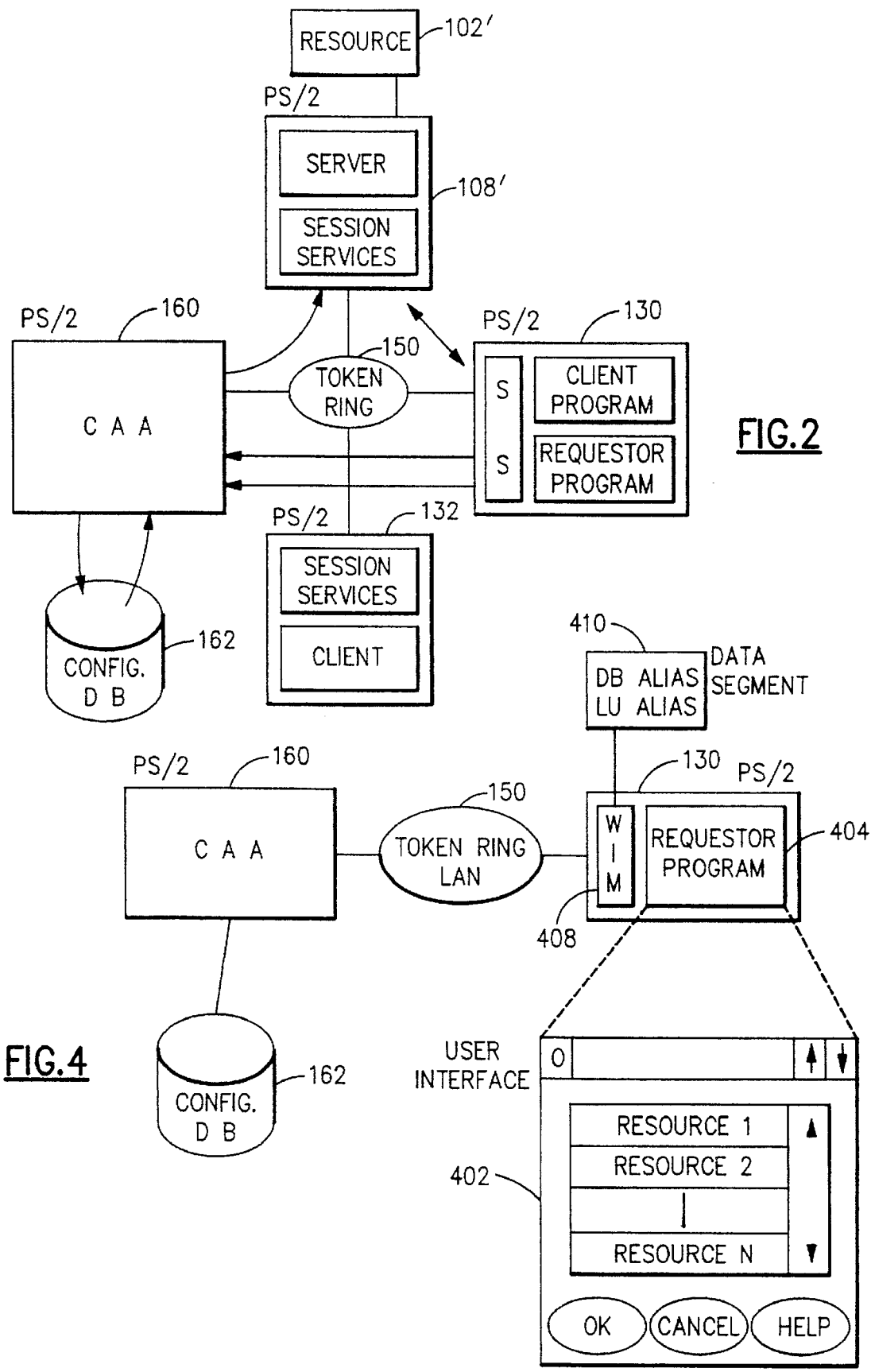

METHOD AND APPARATUS FOR ESTABLISHING COMMUNICATIONS SESSIONS IN A REMOTE RESOURCE CONTROL ENVIRONMENT

CROSS-REFERENCE TO RELATED APPLICATIONS

This application is a continuation of application Ser. No. 08/222,496, filed Apr. 4, 1994, now abandoned, which is a continuation of application Ser. No. 07/771,064, filed Oct. 2, 1991, now abandoned.

BACKGROUND OF THE INVENTION

1. Field of the Invention

The present invention relates to the management of distributed computer systems, and in particular, to the management of distributed systems which provide remote operation facilities for computer hardware resources.

2. Background and Prior Art

The increasing power and complexity of large computer systems, frequently termed "mainframe computer systems", has resulted in an increase in the complexity of computer system operations. The drive for increased workforce productivity, however, has tended to reduce the number of personnel assigned to the operations task. The proliferation of large computer system complexes, such as those used by airline reservations systems, banking centers, and similar computer intensive businesses, has also contributed to the need for more effective facilities for the control of hardware systems resources.

Large computer systems have traditionally been operated from an attached console accessible to the computer operators in a computer room. Each computer system has a dedicated console. Thus, in a large complex of, for example, six computers, six operator consoles require monitoring. Each of these computer consoles displays messages in the order generated by the computer system. Many of the messages are informational, indicating the status of certain operations on the computer systems. Other messages provide warnings of current or impending problems. Finally, a third class of message requires operator response to a request for action, such as mounting a tape, or to correct an error detected in the system. It becomes increasingly difficult for an operator to monitor several consoles with several different types of messages and be able to effectively respond to each one.

One solution to the increasing flow of messages is to develop an automated operations facility that is able to interpret and classify messages. These types of facilities can be constructed to segregate messages by message type and to present the operator with those requiring attention. Automated operations facilities of this type are typically constructed using a workstation computer that can be connected directly to the large computer system. The workstation computer contains the necessary programs for receiving, analyzing, and responding to certain messages.

Productivity gains are frequently achieved by centralizing operator resources in a single operations area. This area may be on a different floor or in a different building than the large computers themselves. Centralization requires that remote access and control of the hardware resource be provided. However, remote access creates a series of problems.

The first problem is the need the develop a system which will allow access to the hardware resource independent of the location of that resource. Next, the system must be designed in a way that allows recovery from the failure of any component in the control system. In other words, control system component failure must not cause the failure of control of the larger system. Finally, the control system must be flexible allowing the addition of controllable resources and individual control points without disrupting the ongoing control activities.

The problem of remote operations and management has been addressed in several ways. In U.S. patent application Ser. No. 07/577,967, filed Sep. 4, 1990, commonly assigned, an automated operations system is described which involves a controller coupled to the processor with remote workstation access for controlling that processor. This configuration provides control but limits remote access and fails to address the problem of control system redundancy and reconfiguration.

U.S. Pat. No. 5,005,122 suggests the use of a client server model for network management tasks. This system provides for management of a local area network (LAN) through the designation of a single network management node which directs other nodes to perform backup, software distribution, or other network management tasks. While this system provides a means for managing a network, there is no recognition or teaching of the management of a large mainframe hardware resource. In particular, there is no recognition of the requirement to establish fault tolerant connection facilities between a console client and the hardware resource.

Thus, there remains a technical problem of creating a system for remotely controlling a resource such as a large computer system in a manner that allows remote access, failure recovery, and configuration flexibility. In particular, the system must have a means for establishing the location of the resource to be controlled and for creating a link between a control console and that resource. In addition, the system must be able to recognize and recover from the failure of any control system component. Finally, a system is required which allows dynamic configuration changes to that control system.

SUMMARY OF THE INVENTION

The present invention is directed to a computer implemented system for providing remote control of a resource. The system of the present invention provides a network for maintaining remote communications between workstations and resources to be controlled. It provides redundant control servers for actually controlling the resource. Client means are connected to the communication network and provide an operator interface and operations control capabilities. Client means further provide an ability to accept operator commands and direct them to the control server as required. Administration means are provided for specifying the locations of resources and potential connection paths and fallback paths for those resources. Finally, failure recovery means are provided for detecting and correcting control system failure by re-establishing client-to-resource connections.

It is therefore an object of the present invention to provide a computer implemented system for distributed control of hardware resources. It is an object of the present system to provide a remotely distributed network that allows communication between a series of network components that include servers for controlling a hardware resource and clients for interacting with an operator. It is an object of the present invention to provide a means for administrating a control network such that connections are established between the elements as required and that any failure of connections is detected and corrected through the use of redundant network components.

These and other objects of the invention will become clear through discussion of the preferred embodiment of the present invention which will be made with reference to the following drawings.

BRIEF DESCRIPTION OF THE DRAWING

FIG. 2 is a block diagram illustrating the steps of establishing an initial client console-to-server session.

FIG. 4 is a block diagram illustrating the step of requesting creation of a session between a client and a host resource.

DETAILED DESCRIPTION OF THE PREFERRED EMBODIMENT

The preferred embodiment of the present invention is implemented to control hardware resources, and in particular, to control the operation of a mainframe computer system such as the IBM 3090 computer system (IBM and 3090 are registered trademarks of the IBM Corporation). It will be recognized, however, that the system of the present invention can be used to control other resources which require operator interaction including resources such as a production assembly line, chemical processing facility, or building environmental system.

Figure 1:
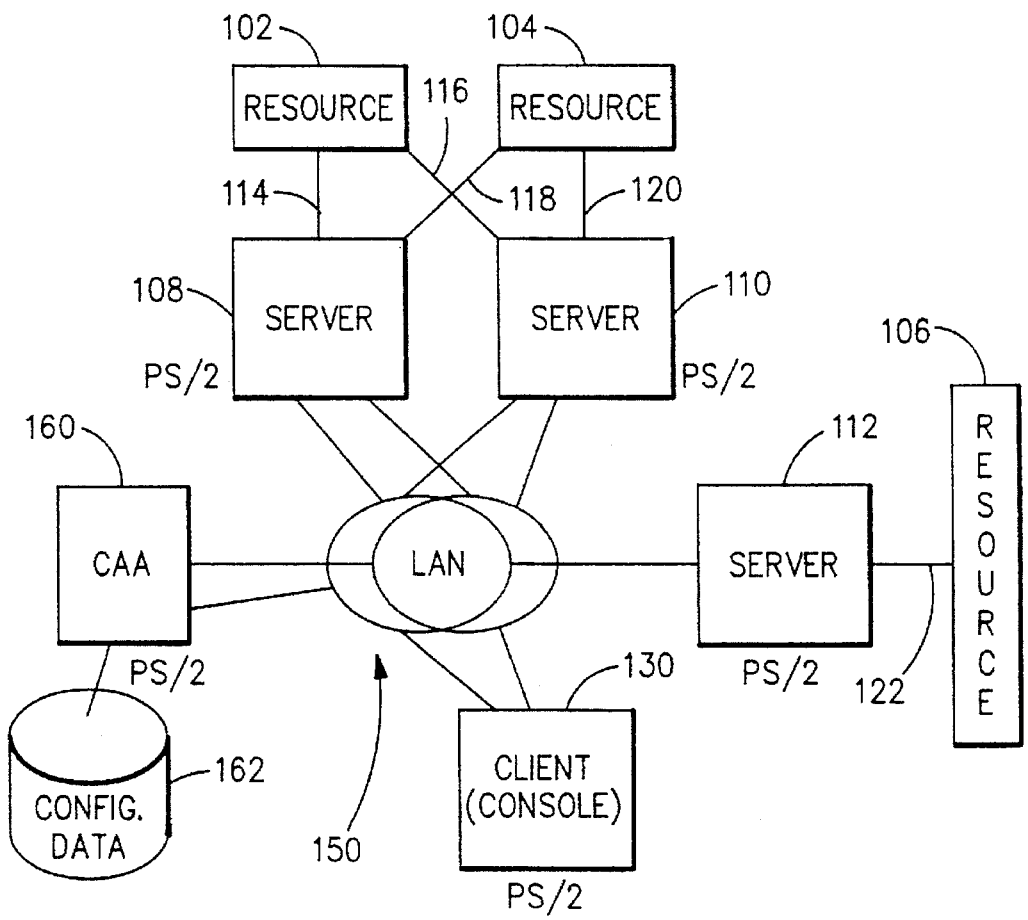
FIG. 1 is a block diagram illustrating a system created according to the present invention.

The structure of a system according to the present invention is shown generally in FIG. 1. Resources to be controlled are identified generally at 102, 104, and 106. It will be recognized that this system is applicable to any number of resources and the example of three is shown for illustrative purposes only.

Each resource is connected to at least one server workstation. Server workstations are shown at 108, 110, and 112. These workstations are an intelligent device such as an IBM Personal System/2 computer system (PS/2) (Personal System/2 and PS/2 are registered trademarks of the IBM Corporation). The servers are connected to hardware resources by communication lines 114, 116, 118, 120 and 122. In the preferred embodiment, a resource typically is connected to more than one server to provide a fallback control path. For example, resource 102 is connected via communication path 114 to server 108 and by communication path 116 to server 110.

A client workstation 130 (such as an IBM PS/2 computer system) is provided as a console for operator use. The client workstation manages the operator interaction including the presentation of messages to the operator and the generation or acceptance of commands for controlling the hardware resource. The separation of client and server functions allows a balancing of workload between the devices. It also allows a single client console to manage a number of hardware resources. In the example shown in FIG. 1, client console 130 can manage resources 102, 104, and 106.

The client console communicates with the servers by means of a local area network (LAN) shown generally at 150. This network can be any one of several known networks, such as the IBM Token Ring LAN, an Ethernet LAN, or others. In the preferred embodiment, the control scheme is implemented using dual token ring LANs which provide for redundancy in case of the failure by either individual LAN.

A central control facility containing control and administrative applications (CAA) is provided to control the operation of the control system. This control server 160 is a workstation which has been configured to support and control the overall operation of the resource control system. The control server provides centralized control to ensure that console access exists for each resource to be controlled and that the client workstations know how to access each resource and how to recover from component failure. Control server 160 manages the network based upon configuration data stored in a database 162. This data can be stored in a variety of known forms such as files on the server or data under the control of the database management system.

The configuration data consists of two major types of data. First, static configuration data contain a description of each hardware resource location to be controlled. It also contains the parameters necessary for accessing and controlling that resource and identifies primary and fallback access paths to that resource. The second type of data is dynamic configuration data describing the current configuration for controlling each resource. This data is maintained to assure that each resource is under the control of a console and for use by fallback processing routines to re-establish communications in the case of a failure.

Figure 3:
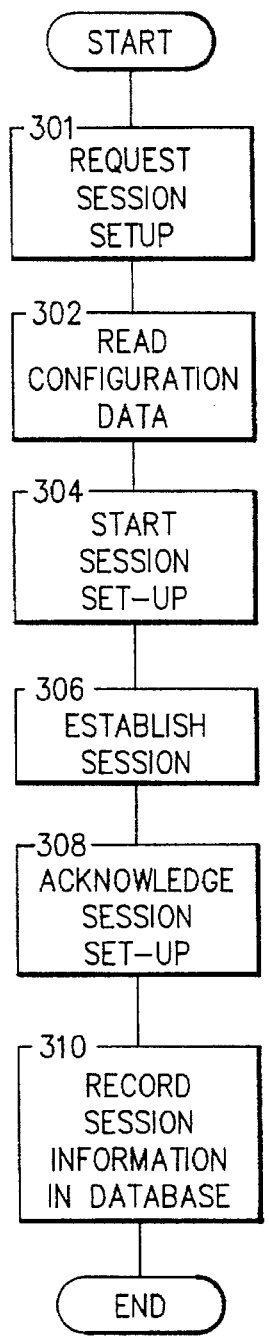
FIG. 3 is a flowchart illustrating the process steps for establishing an initial client/server session.

The operation of the system to establish a resource control environment will be described with reference to FIG. 2. A resource control environment includes a console for operator interaction, control routines and communications processes for hardware resource management. FIG. 3 is a flowchart presenting the process steps required to establish the control environment.

The control environment for a particular hardware resource is initiated by an operator requesting that a console session be established between a particular client console and a resource. The client console is typically distributed remotely from the hardware resource and a network session must be established between the client console and the resource. The operator requests an access to a resource by selecting that resource from a list of resources presented in a user interface. FIG. 4 illustrates the network accesses required to establish a console session with a particular resource. Screen image 402 is an example of a visual interface to the operator presenting a list of resources that may be selected for console connection. The operator uses a cursor control device, such as a mouse, to select a resource from the menu provided. The requestor program 404 operating in workstation 130 uses the services of a workstation information manager 408 to determine the location of the control server CAA 160. The location of the control database is specified in a data segment 410 and is used by the workstation for access over token ring LAN 150 to the control server 160 (step 301).

Next (step 302 in FIG. 3) the control server 160 accesses configuration database 162 to determine the location of the hardware resource to be accessed by the console. In the example in FIG. 2, resource 102' is to be accessed. The configuration data 162 will determine that resource 102' is controlled by server 108' and will initiate a session startup 304 by sending a message to server 108'. 108' is responsible for establishing a control session (step 306) with the client console 130. Once the session is successfully established over the network, the client console 130 sends (step 308) a successful session startup acknowledgement to the control server 160. The control server will then record 310 the session startup information in the dynamic data portion of configuration database 162.

Figure 6:
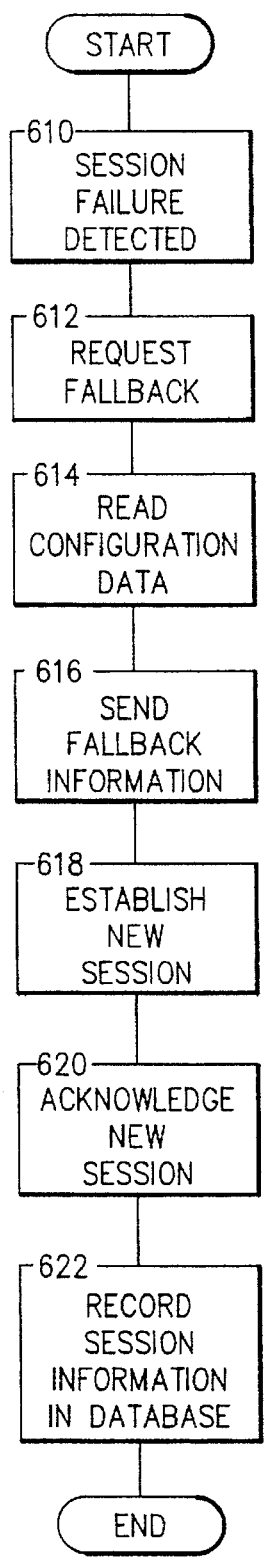
FIG. 6 is a flowchart illustrating the process steps of recovering from a client failure.
Figure 5:
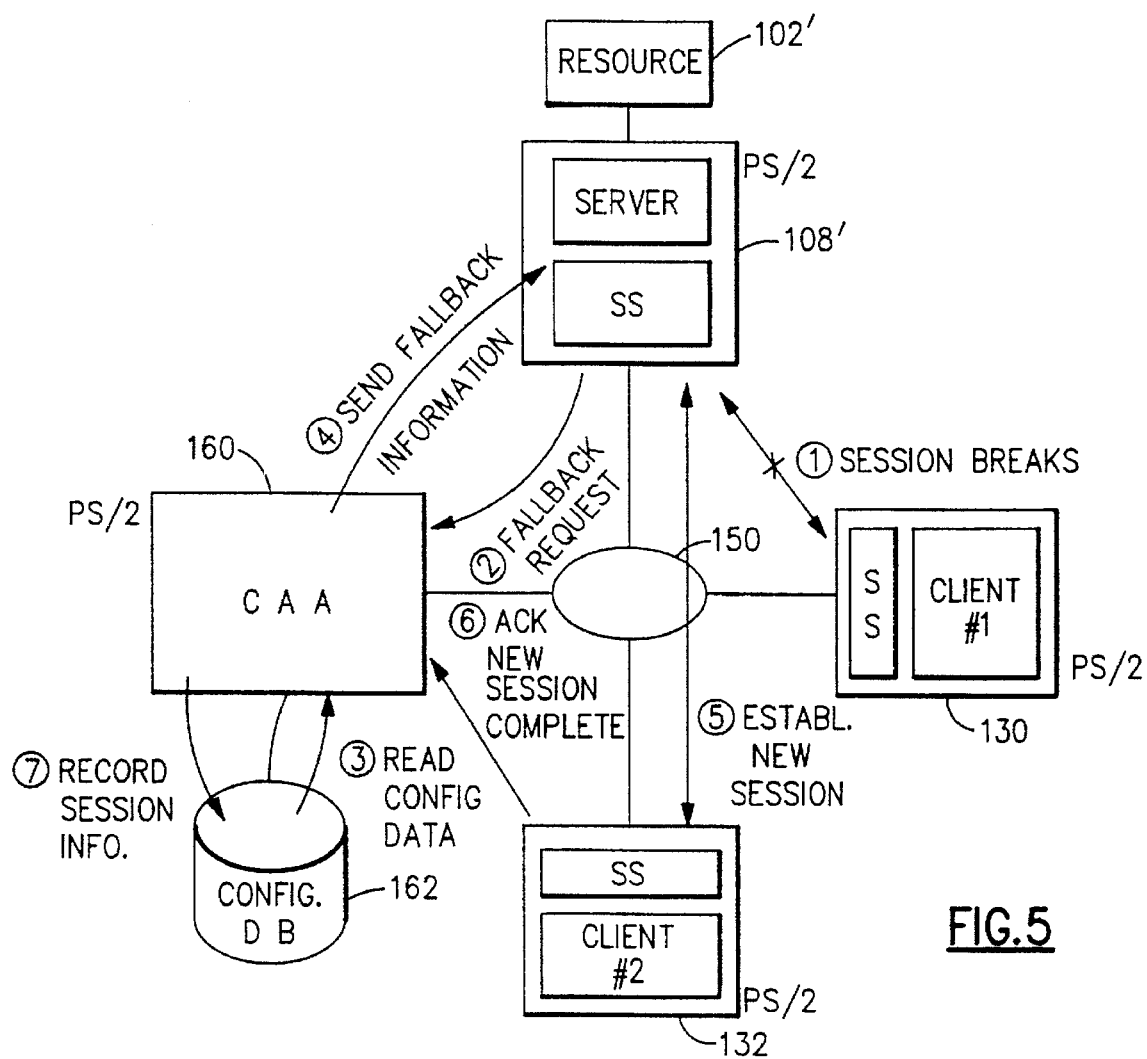
FIG. 5 is a block diagram illustrating the actions occurring upon the failure of a client console workstation.

FIG. 5 illustrates the message flow for recovering from a client console failure. FIG. 6 is a flowchart describing that process. In step 610, the server 108' detects the failure of the network session between it and the client console 130. Server 108' sends a fallback request to control server 160 (step 612). The control server accesses the configuration database 162 to determine configuration fallback data (614). Fallback information is sent 616 to server 108' which then establishes a new session 618 with the fallback client console, in this case, console 132. Client console 132 sends an acknowledgement 620 to the control server 160 when the session is successfully established. Control server 160 records the new session information 622 in the dynamic portion of configuration database 162.

Figure 8:
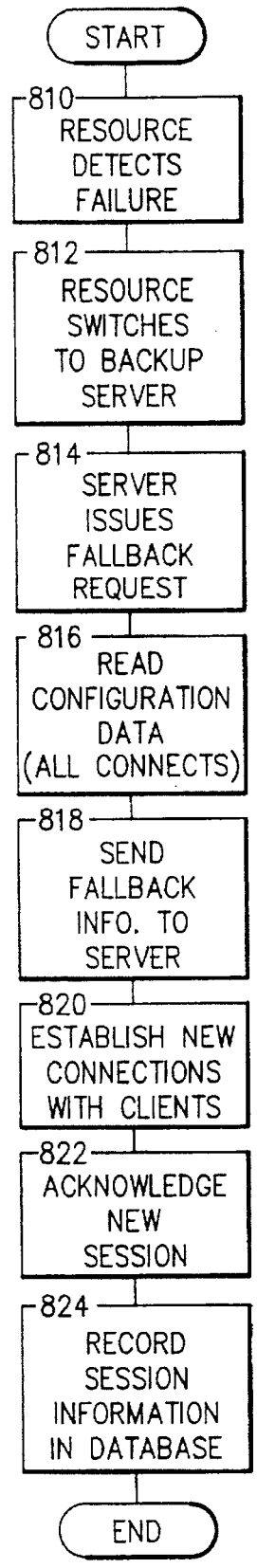
FIG. 8 is a flowchart illustrating the process steps for recovering from a server failure.
Figure 7:
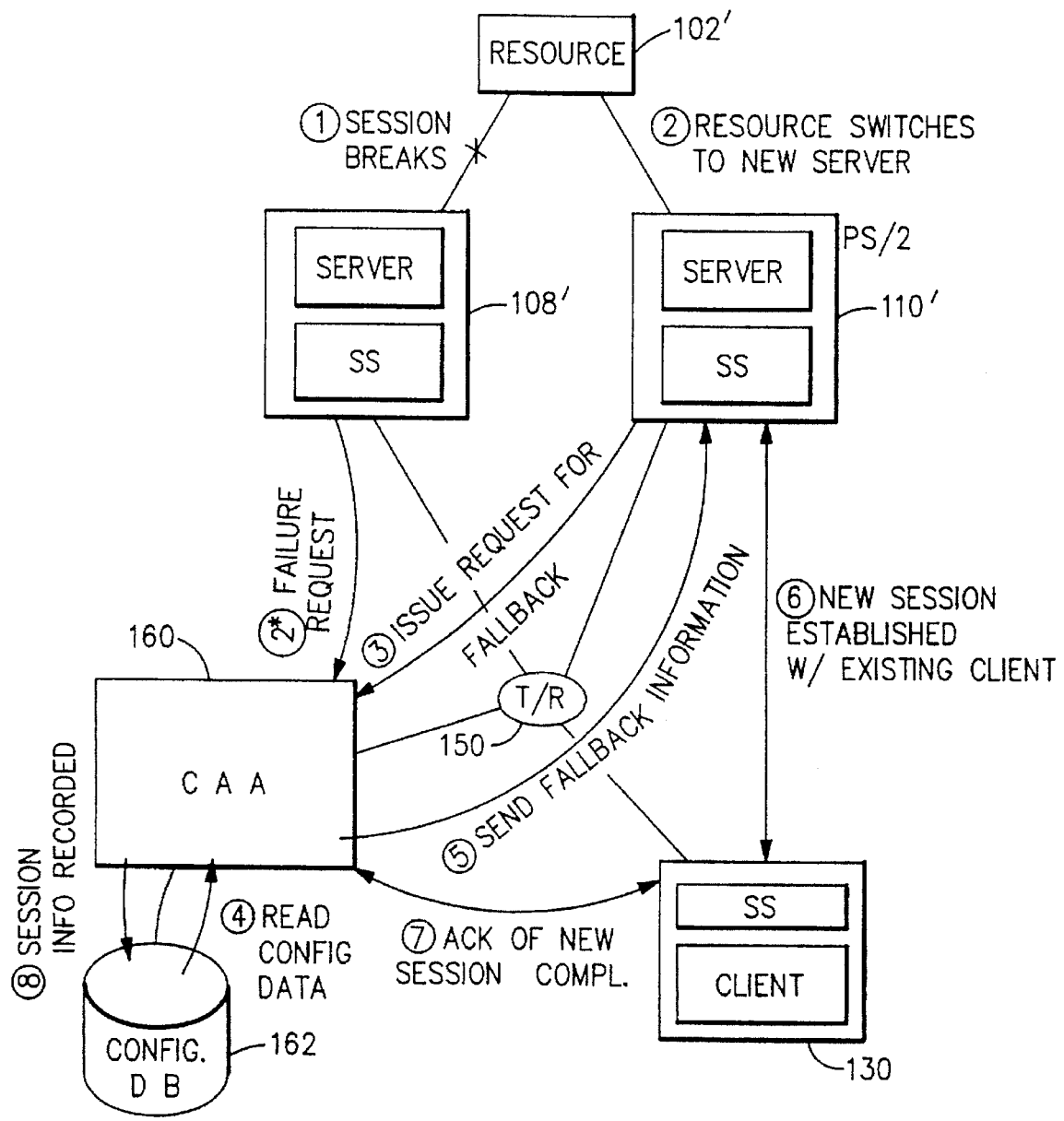
FIG. 7 is a block diagram illustrating recovery from a server failure.

FIG. 7 illustrates the process for recovering from the failure of a resource server and FIG. 8 lists the process steps for that recovery. The failure of a server must be detectable by the resource under control 102' which then must have the ability to switch to a backup server. Upon detection of server failure 810, resource 102' initiates control switch to backup server 110' (812). Server 110' recognizes the resource action and issues 814 a fallback request to the control server 160. Control server 160 accesses the configuration database to determine the client console sessions impacted by the failure of server 108' (816). The dynamic configuration data indicates all connected sessions and can be used by the fallback server 110' to re-establish those connections. The fallback information is sent 118 to server 110' (818). Server 110' establishes new connections with each client console previously connected to server 108', for example, client console 130 (820). Upon successful session establishment, client console 130 sends an acknowledgement of the new session 822 to the control server 160. The control server records the new session information in the dynamic portion of the configuration database 162 as step 124 (824).

An alternate embodiment of the present invention employs interprocess security to enhance the reliability of server tasks. The control server 160 and hardware resource servers (e.g. 108') operate using "frontend" tasks for network communication and "backend" tasks for configuration control and resource control. The division of processing tasks into frontend and backend tasks raises the issue of security in the communications between those frontend and backend tasks. Because the backend tasks interact with computer system resources and thereby have a major impact upon computer system operation, security of messages and data transmitted to the backend tasks is important. The backend tasks must be able to ensure that the messages it receives originated from an authorized frontend task and not another unauthorized program attempting to manipulate the system resources. Second, the backend task must be able to detect possible modifications of data during the transmission process from an authorized frontend to a backend. Finally, the backend must be able to detect the situation where authorized frontend information is captured, modified, and later transmitted to the backend. The solution to this problem is to develop a security key to be combined with the data sent between the front and backends. This key must be such that interception and modification of an authorized message is detected and that it be difficult to decompose the key to reverse engineer the security algorithm.

A security key meeting these requirements is constructed on the basis of three values. First, the address of a shared memory segment sharable between frontend and backend tasks. Second, a standard check sum of the data. Finally, a random number. The combination of these three components provides a secure key meeting the objectives of the security system. First, the address of a shared memory segment indicates the task sending the data is authorized to operate on the computer system and have access to the shared memory. The check sum of the data ensures that the data received by the backend task has not been modified enroute or captured and modified. Finally, the random number introduces a degree of variability and randomness into the key.

Figure 10:
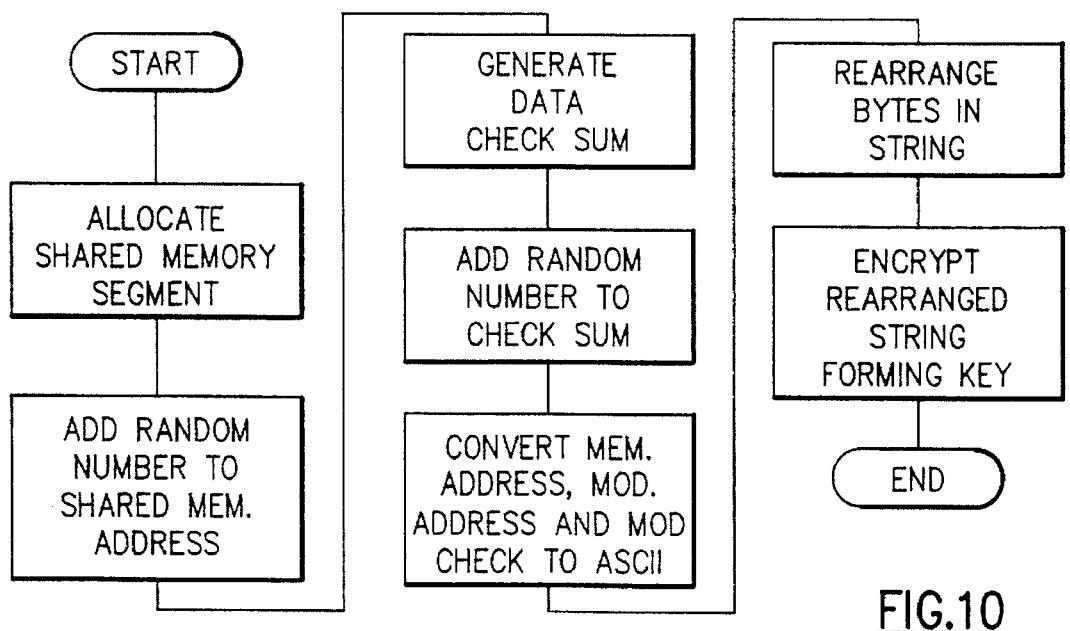
FIG. 10 is a flowchart depicting interprocess security key generation.

The generated key is created according to the process shown in FIG. 10. This operates as follows.

The checksum is first copied into a shared memory segment of known address. The random number is added to the address of the shared memory segment. The random number is added to the check sum value. All three numbers are converted into ASCII digits. The results of the conversion are concatenated into a single string of digits. The bytes in the concatenated string are exchanged according to a predetermined pattern. The resulting character string is encrypted using a logical "exclusive or" operation on a character-by-character basis with a known static value.

The security key for the message is sent with the data to the backend task. The backend task validates the key by reversing the above construction process.

This method of constructing the key is unique because it combines elements derived from the calling environment (the address of the shared memory segment), along with elements derived from the actual data sent (the check sum value), and a random factor to help conceal the security method and protect against attempts to reverse engineer the key structure algorithm.

Figure 9:
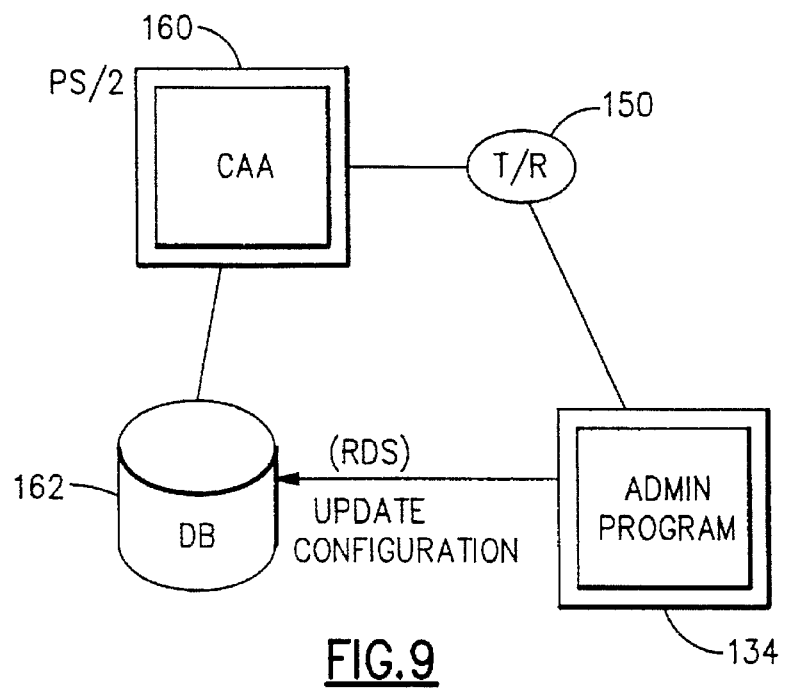
FIG. 9 is a block diagram illustrating the administrative update of configuration data.

The final problem addressed by the present invention is an ability to dynamically update the configuration information in configuration database 162. FIG. 9 illustrates the update network configuration. An administrative program operates in a client server, for example, client server 134. (The administrative program could also operate on one of the console client servers, e.g., 130 or 132). The administrative program collects the information necessary to update the configuration data to add a resource, or to change resource access paths or fallback paths and transmits it for update over token ring LAN 150. In the preferred embodiment, the database update is accomplished using the remote data services facility of the Operating System/2 (OS/2) operating system (OS/2 is a registered trademark of the IBM Corporation). The update is accomplished by modifying configuration database 162. The modified configuration information will take effect whenever control server 160 is required to establish a new session between client and server workstations. Existing sessions will continue to process as originally set up until manually terminated or until a failure is detected, in which case the above-described failure recovery process will be employed using the updated configuration information.

This description of the preferred embodiment describes the components and processes necessary to establish a centralized control process for a distributed resource controller. It will be understood from the foregoing description that various modifications and changes may be made in the preferred embodiment of the present invention without departing from its true spirit. This description is intended for the purpose of illustration only and should not be construed in a limiting sense. The scope of this invention should be limited only by the language of the following claims.

We claim:

1. A method for recovering from a failure in a remote resource control environment wherein a resource is controlled by a resource server directed by a remote client, said remote client and said resource server being interconnected by a communications network, said method comprising the steps of:

maintaining fallback configuration data by specifying a fallback client from a control server, said fallback client and said control server being connected to said resource server via said network;

controlling and maintaining administration programs and other related data in a central control facility having direct access to said configuration data, said control facility being connected to said remote client and said fallback client and servers via said network;

detecting from said resource server the failure of a communications session between said resource server and said remote client;

in response to the detection of said session failure, transmitting a request for fallback configuration data specifying said fallback client from said resource server via said network to said control server;

accessing said fallback configuration data specifying said fallback client from said control server and transmitting said fallback configuration data via said network to said resource server; and establishing a new communications session over said network with said fallback client from said resource server using said fallback configuration data.

2. The method of claim 1, further comprising the step of transmitting an acknowledgment of said new communications session from said fallback client to said control server.

3. The method of claim 1, further comprising the step of updating said configuration data from said control server with information on said new communications session.

4. A method for recovering from a failure in a remote resource control environment wherein a resource is controlled by a primary resource server having a communications session with a client, said client and said primary resource server being interconnected by a communications network, said method comprising the steps of:

maintaining fallback configuration data from a control server, for a fallback resource server for said resource, said fallback resource server being connected to said client via said network and said control server being connected to said fallback resource server also via said network, said resource being controllable by said fallback resource server in the event of a failure in said primary resource server;

controlling and maintaining administration programs and other related data in a central control facility having control direct access to said configuration data, said control facility being connected to said remote client and said fallback client and servers via said network;

detecting from said resource a failure in said primary resource server;

in response to the detection of said failure in said primary resource server, transmitting a notification of said failure from said resource to said fallback resource server;

in response to receiving said notification, transmitting a request for fallback configuration data from said fallback resource server via said network to said control server;

accessing said fallback configuration data from said control server and transmitting said fallback configuration data via said network to said fallback resource server; and initiating a new communications session over said network with said client from said fallback server using said fallback configuration data.

5. The method of claim 4, further comprising the step of transmitting an acknowledgment of said new communications session from said client to said control server.

6. The method of claim 4, further comprising the step of updating said configuration data from said control server with information on said new communications session.

7. The method of claim 4 wherein said primary resource server has communications sessions with a plurality of clients and wherein said fallback resource server initiates new communications sessions with each of said clients.

8. Apparatus for recovering from a failure in a remote resource control environment, said apparatus comprising:

at least one resource, said resource being controlled by a resource server directed by a remote client;

said remote client and said resource server being interconnected by a communications network;

a control server having means for maintaining fallback configuration data specifying a fallback client, said fallback client and control server being connected to said resource server via said network;

a central control facility for controlling and maintaining all administration programs and other related data pertaining to the operation of said environment, said central control facility having direct access to all configuration data;

said control facility being connected to said remote client, fallback client and said servers via said network;

means at said resource server for detecting the failure of a communications session between said resource server and said remote client;

means at said resource server responsive to the detection of said session failure for transmitting a request for fallback configuration data specifying said fallback client via said network to said control server;

means at said control server for accessing said fallback configuration data specifying said fallback client from and transmitting said fallback configuration data via said network to said resource server; and means at said resource server for establishing a new communications session with said fallback client using said fallback configuration data.

9. Apparatus for recovering from a failure in a remote resource control environment wherein a resource is controlled by a primary resource server having a communications session with a client, said client and said primary resource server being interconnected by a communications network, said apparatus comprising:

a control server having means for maintaining fallback configuration data for a fallback resource server for said resource, said fallback resource server being connected to said client via said network and said control server also being connected to said fallback resource server via said network, said resource being controllable by said fallback resource server in the event of a failure in said primary resource server;

a central control facility for controlling and maintaining all administration programs and other related data directed pertaining to the operation of said environment, said central control facility having direct access to all configuration data;

said control facility being connected to said remote client, fallback client and said servers via said network;

means at said resource for detecting a failure in said primary resource server;

means at said resource responsive to the detection of said failure in said primary resource server for transmitting a notification of said failure from said resource to said fallback resource server;

means at said fallback resource server responsive to receiving said notification and transmitting a request for fallback configuration data via said network to said control server;

means at said control server for accessing said fallback configuration data and transmitting said fallback configuration data via said network to said fallback resource server; and means at said fallback server for initiating a new communications session over said network with said client using said fallback configuration data.

\* \* \* \* \*